United States Patent [19]

Goodfellow et al.

[11] 4,028,042

[45] June 7, 1977

[54] MOULDING APPARATUS

[75] Inventors: Anthony Gerald Goodfellow, Maghull, near Liverpool; Maurice Rand, Skelmersdale, both of England

[73] Assignee: Dunlop Limited, London, England

[22] Filed: Apr. 14, 1975

[21] Appl. No.: 567,843

Related U.S. Application Data

[63] Continuation of Ser. No. 495,135, Aug. 6, 1974, abandoned.

[30] Foreign Application Priority Data

Aug. 14, 1973 United Kingdom ............ 38338/73

[52] U.S. Cl. .................... 425/515; 425/233; 425/388; 425/405 R; 425/408; 425/445; 425/446; 425/503; 425/508; 425/516; 425/504; 156/145; 156/147

[51] Int. Cl.² ............ B29C 17/00; B29F 1/00

[58] Field of Search ............ 425/405 R, 408, 233, 425/387, 388, 445, 500, 303, 506, 507, 508, 515, 518, 116, 242, 504, 249; 156/147

[56] References Cited

UNITED STATES PATENTS

| 2,098,395 | 11/1937 | Law ................................ 425/233 |
| 2,200,634 | 5/1940 | O'Koornian .................... 425/233 |
| 2,490,625 | 12/1949 | Hall ................................ 425/242 X |
| 2,531,888 | 11/1950 | Nye et al. ........................ 425/242 |
| 2,537,089 | 1/1951 | Rempel .......................... 425/116 |
| 2,560,370 | 7/1951 | Roberts .......................... 425/405 X |
| 2,575,190 | 11/1951 | Sedgwick ........................ 425/242 X |
| 2,783,501 | 3/1957 | Kutik .............................. 425/242 X |
| 3,362,045 | 1/1968 | Jones-Hinton et al. .......... 425/388 |
| 3,661,489 | 5/1972 | Moore ............................ 425/388 X |
| 3,825,457 | 7/1974 | Holroyd et al. .................. 425/147 |

FOREIGN PATENTS OR APPLICATIONS

| 482,780 | 1/1917 | France .............................. 425/405 |
| 517,663 | 12/1920 | France .............................. 425/405 |

*Primary Examiner*—J. Howard Flint, Jr.
*Attorney, Agent, or Firm*—Stevens, Davis, Miller & Mosher

[57] ABSTRACT

A moulding apparatus including a pair of mould cavities with locking spue grooves, means to form moulded rubber article parts in the cavities, means to prework the rubber without substantial curing before it is formed, means to pressurize the mould with gas and means to bring the mould cavities together to join the article parts. The arrangement for pressurizing the mould includes a retractable casing which is movable between a position in which the mould cavities are enclosed to permit their pressurization and a position in which the cavities are accessible outside the casing.

13 Claims, 7 Drawing Figures

MOULDING APPARATUS

This is a Continuation of application Ser. No. 495,135 filed Aug. 6, 1974, now abandoned.

This invention relates to a moulding apparatus and is an improvement in or modification of the apparatus described in the assignee's U.S. Pat. No. 3,825,457.

In U.S. Pat. No. 3,825,457 there is described a moulding apparatus which comprises at least one pair of female mould cavities, means to form moulded halves of rubber in those cavities, the cavities being provided with locking spue grooves to prevent displacement of the halves, means to pre-work the rubber without any substantial curing prior to its being formed, means to pressurize the mould with gas and means to bring each pair of mould cavities together to join their respective halves together.

In that application the apparatus illustrated achieves pressurization by enclosing the mould in a chamber into which gas under pressure may be introduced. This arrangement is satisfactory from the standpoint of operation of the moulding process but has the disadvantage that it does not allow easy access to the moulds for inspection or for removal of finished moulded articles, a door in the casing providing the only simple access.

According to the present invention a moulding apparatus comprises at least one pair of mould cavities, means to form moulded article parts of rubber in those cavities, the cavities being provided with locking spue grooves to prevent displacement of the moulded parts, means to pre-work the rubber without any substantial curing prior to its being formed, means to pressurize the mould with gas and means to bring each pair of mould cavities together to join their respective moulded parts together, the means to pressurize the mould including a retractable casing which is movable between an operative position wherein the mould cavities are enclosed and a retracted position wherein the mould cavities are accessible outside the casing.

The mould cavities are preferably located in a pair of mould halves the mould halves each being surrounded by a sleeve. The mould halves and surrounding sleeves are preferably movable together by means of a press. In this arrangement the casing preferably does not enclose the whole of the mould halves, but is provided with seals which provide a gas-tight fit against the sleeves when the casing is in the operative position. The casing may conveniently be movable in the same direction as the line of action of the press.

In a particularly preferred arrangement when high pressurization is required the size of the sleeves and arrangement of the seals is such that the casing will maintain an internal gas pressure in both operative and retracted positions and during movement between them.

The apparatus of the invention will now be described in more detail, by way of example only, with reference to the accompanying drawings in which.

Figure 1:
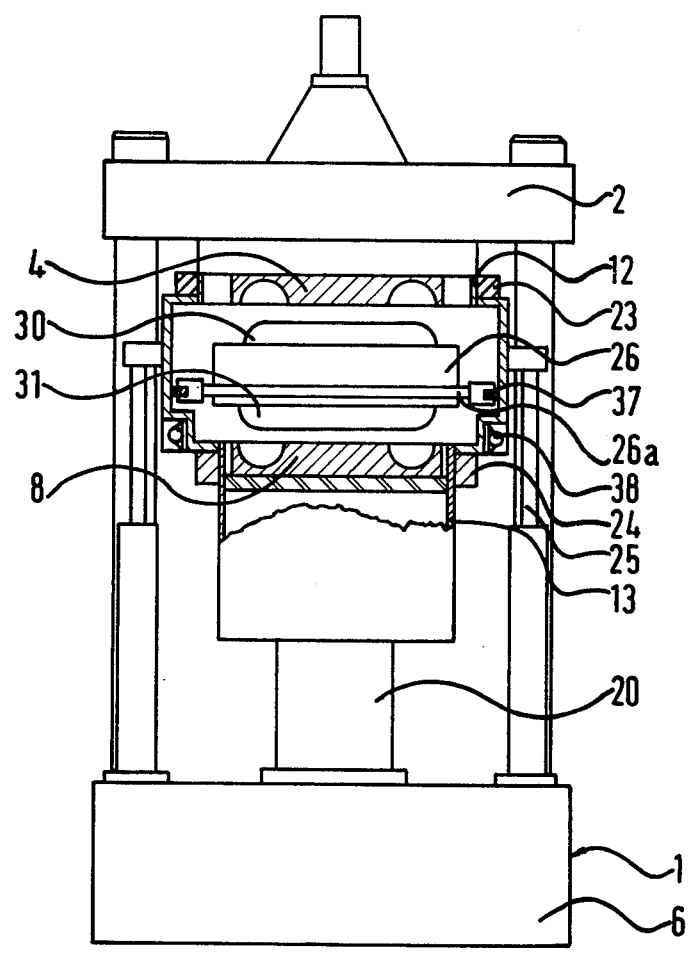
FIG. 1 is an end elevation of a tube moulding apparatus part in section, showing the casing in the operative position.

The apparatus consists of a press 1 the head 2 of which carries a mould half 3 and a heat sink 4 and a filling screw 5 to feed rubber through the center of the heat sink 4. From the base 6 of the press there are supported on rams, a second mould half 7, a second heat sink 8 and a retractable pressure casing 9. The mould halves 3 and 7 and heat sinks 4 and 8 are each provided with cylindrical sleeves 10, 11, 12 and 13 respectively.

The apparatus is a transfer moulding apparatus in which the mould halves 3 and 7 contain mould cavities 14, 15 which are, in the case illustrated, annular cavities for moulding halves of annular tubes e.g. inner tubes for pneumatic tires. At the edge of each cavity there is a spue groove 14a, 14b, 15a, 15b. The mould halves 3 and 7 are axially aligned and the lower half 7 may be raised toward the upper half 3 by a limited stroke high power main ram 16 and also by double acting auxiliary rams 17.

The heat sinks 4 and 8 also contain annular cavities 18, 19 and the lower heat sink 8 is movable towards the upper heat sink 4 on a double acting main ram 20.

Figure 2:
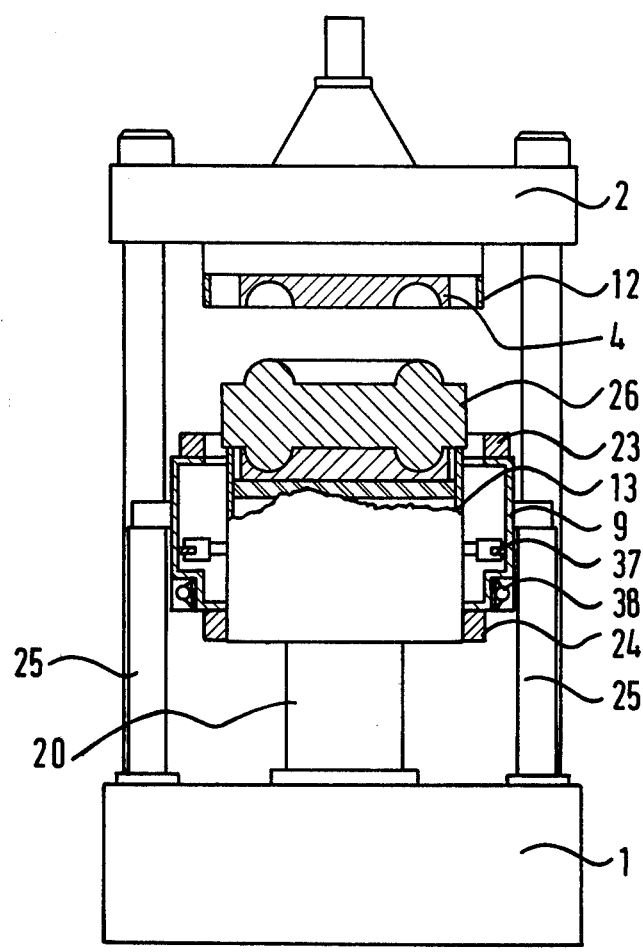
FIG. 2 is a similar view to FIG. 1 except that the casing is in the retracted position.
Figure 3:
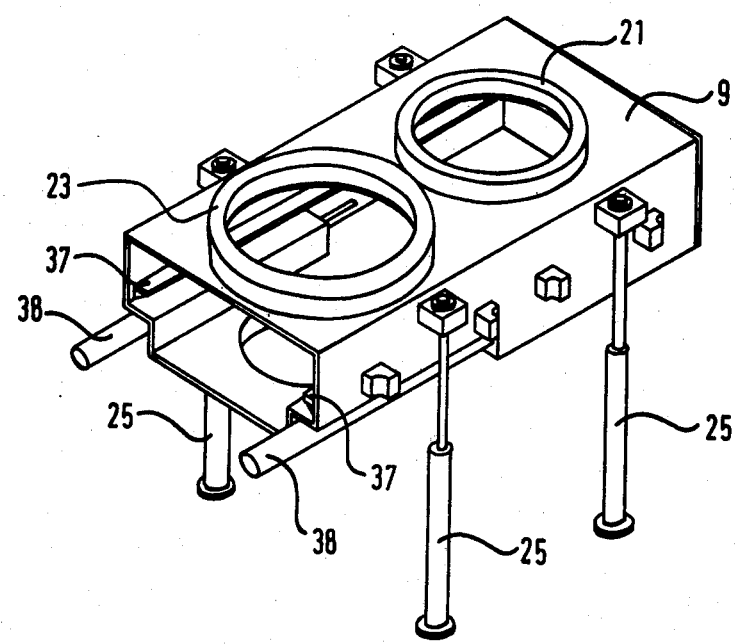
FIG. 3 is a perspective view of the casing.
Figure 4:
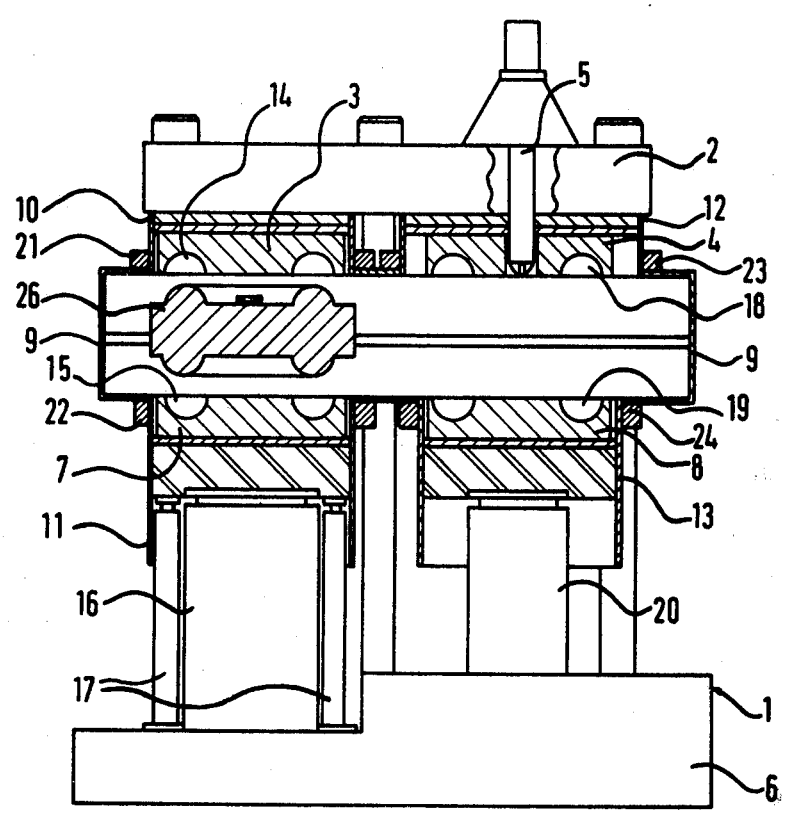
FIG. 4 is a side elevational view of the apparatus part in section, showing the casing in the operative position.

The casing 9 is provided with seals 21, 22, 23 and 24 which, when the casing is in the operative position shown in FIGS. 1 and 4, achieve a gas-tight seal with the mould half sleeves 10 and 11 and the heat sink sleeves 12 and 13 respectively. Rams 25 (see FIG. 3) are provided to move the casing between its operative position (FIGS. 1 and 4) and its retracted position (FIG. 2). Air may be supplied under pressure to the casing in its operative position through an inlet port in the casing via control valves.

The apparatus also includes a mould center section 26 which is movable between two positions one in alignment between the mould halves 3 and 7 and the other in alignment between the heat sinks 4 and 8. The center section 26 consists of three parts (see FIGS. 5 and 6); a center plate 27, top plate 38 and bottom plate 29. The top and bottom plates 28 and 29 carry male formers 30 and 31 corresponding with the cavities 14, 15 and define with the center plate a transfer chamber 32 which may be fed with rubber through a non-return valve 33 from the filling screw 5 and through passage 34 in the top plate. Rubber passes from the transfer chamber 32 to the mould cavities during the transfer step via passage 35 in the top and bottom plates and short injection passages 36 in the mould halves (see FIG. 5). The mould halves 3 and 7, center plate 27 and top and bottom plates 28 and 29 each contain passages 39, 40, 41, 42 and 43 for circulation of heating or cooling fluid to permit accurate temperature control of the moulding apparatus during use.

The mould center section is carried on a carriage 26a (see FIG. 1) in the casing and is movable along runners 37 on the sides of the casing by means of hydraulic cylinders 38.

In operation the apparatus functions as follows. The mould center section 26 is initially aligned between the heat sinks 4 and 8. The lower heat sink is moved upwardly to contact the bottom plate of the mould center section, the former 31 entering the cavity in the heat sink. Movement is continued to force the top plate 28 of the mould center section 26 against the heat sink 4 so positioning the outlet of the injection screw 5 in the mouth of the passage 34.

The transfer chamber 32 is filled with a measured quantity of rubber from the injection screw 5 which works the rubber sufficiently to destroy its nerve or memory but does not sufficiently heat the rubber to commence appreciable cure. During this time the formers 30 and 31 are cooled by the heat sinks 4 and 8. This filling step can take place with the casing 9 raised or lowered. Timing of the filling is preferably arranged so that the freshly filled center part is available as soon as the moulds have been stripped.

Figure 5:
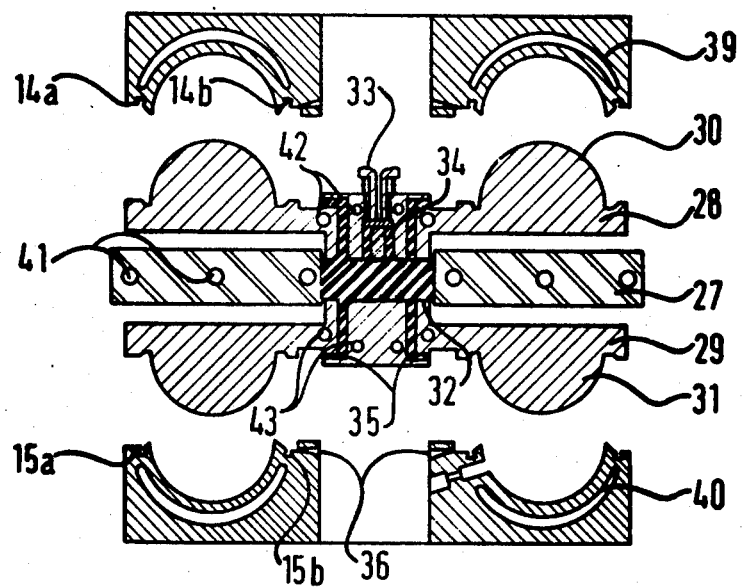
FIGS. 5 and 6 are more detail views showing in section the mould halves and center section.

The mould center section is then as shown in FIG. 5 and is lowered away from the heat sink 4, the heat sink 8 also is disengaged and the center section 32 is moved into position between the mould halves 3 and 7 by the hydraulic cylinders 38. It will be appreciated that at this stage the casing 9 must be in the raised position to permit the mould center section to be moved on the carriage 26a along the runners 37.

Figure 6:
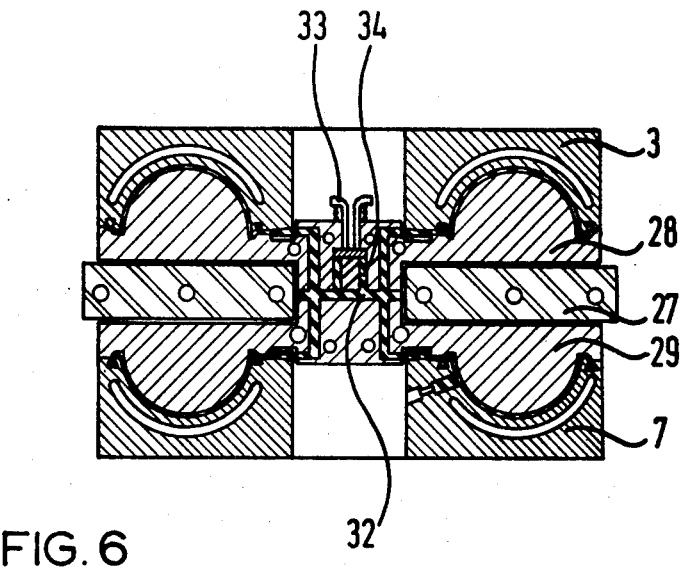
Figure 7:
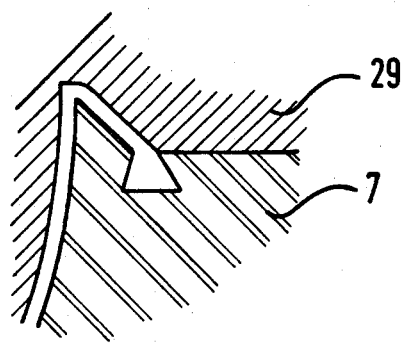
FIG. 7 is a detail from FIG. 6 showing the shape of the locking spue groove.

The center section 26 is then lifted on the lower mould half 7 until it engages the upper mould half 3, and high pressure is applied by the main ram 16 to squeeze the top and bottom plates of the center section together, thus forcing rubber from the transfer chamber 32 through the passages 35 and 36 into the moulds defined in the cavities 14, 15 by the co-operation of the cavities 14, 15 and their respective formers 30, 31 as shown in FIG. 6. The rubber at this stage is still warm and in the worked condition but it is not appreciably cured.

As the transfer operation is taking place or preferably immediately when it is completed the casing 9 is pressurized to 10 to 30 psi, e.g. 10 psi for butyl rubber tubes, with air and when transfer is complete and the desired air pressure has been obtained the center section and lower mould half are retracted, the co-operation of the air pressure and spue grooves 14a and 15a maintaining the moulded tube halves in their respective mould cavities.

The mould center section is then moved on its carriage to its position between the heat sinks and the mould halves are moved together by the auxiliary rams 17 to join the moulded halves while the rubber is still warm and in the worked condition. The mould halves are then heated, e.g. by steam circulated in the passages 39, 40, to cure the rubber tube now formed.

Finally the mould halves 3 and 7 are moved apart and the casing 9 is moved to its retracted position to permit the cured tube to be stripped from the mould.

It will be appreciated that in the apparatus illustrated the casing is de-pressurized when it is retracted since the seal 23 on the upper heat sink 4 is of larger diameter than that on the lower heat sink 8. This is because the mould center section is of greater diameter than the lower heat sink to permit the carriage in the casing to engage the mould center section as the casing is lifted to its operative position.

When a higher pressurization is required e.g. to 15–30 psi, however, the seals will preferably be arranged to be the same size to permit the casing to be air-tight during the whole of the operation. This will require a carriage which is also retractable to enable it to engage the mould center section yet when required to also pass over the lower heat sink.

Having now described our invention, what we claim is:

1. A moulding apparatus for moulding a hollow rubber article which is first formed in two or more separate parts, the apparatus comprising:
   a. means to pre-work unvulcanized rubber without any substantial curing, prior to the rubber being formed into the parts;
   b. two mould halves arranged for relative movement towards and away from each other, and each having a mould cavity for a respective one of said article parts, and a locking spue groove adjacent said mould cavity to prevent accidental displacement of a moulded article part from its respective mould cavity;
   c. two sleeves respectively surrounding and carried by said two mould halves and having similar radial cross-section;
   d. male formers to co-operate respectively with the mould cavities to provide mould chambers into which molten rubber can be fed to provide said article parts;
   e. means to feed the pre-worked rubber to said mould chambers; and
   f. means to provide super-atmospheric gaseous pressure in the space between the mould halves when separated apart, said last recited means including a retractable casing which is movable between an operative position in which the mould halves are enclosed in a gas-tight volume by the casing, and a retracted position in which the mould halves are not enclosed in a gas-tight volume, said casing having in two opposed walls thereof corresponding apertures which can engage in a gas-tight fit the two respective sleeves carried by the two mould halves.

2. A moulding apparatus according to claim 1 in which the mould halves are movable towards each other by means of a press.

3. A moulding apparatus according to claim 2 in which the casing is movable in the same direction as the line of action of the press.

4. A moulding apparatus according to claim 1 in which the casing is provided with seals which provide a gas-tight fit against the sleeves when the casing is in the operative position.

5. A moulding apparatus according to claim 4 in which the size of the sleeves and arrangement of the seals is such that the casing will maintain an internal gas pressure in both operative and retracted positions and during movement between them.

6. A moulding apparatus according to claim 1 in which the mould halves are movable towards and away from each other within the casing to permit the mould to be opened and closed while the casing is pressurized.

7. A moulding apparatus according to claim 1 in which the means to form moulded article parts of rubber in the mould cavities comprises a mould center-section including a pair of male formers for co-operation with the mould cavities, transfer chambers which can be filled with rubber compound and passages to permit rubber to be forced from said transfer chambers simultaneously to the mould chambers defined by the co-operation of the mould cavities and the co-operation of the mould cavities and the respective male formers to form moulded article parts.

8. A moulding apparatus according to claim 7 in which the mould center section is movable between two positions, one in alignment between the mould cavities the other clear of said mould cavities.

9. A moulding apparatus according to claim 8 further comprising a pair of heat sinks for the mould center section located in the position clear of the mould cavities to permit temperature control of the center section, and associated with one of said heat sinks an injection port from a filling screw for supply of rubber to the mould center section.

10. A moulding apparatus according to claim 9 further comprising a subsidiary press ram to close the heat sinks about the mould center section and hold the mould center section against the injection port to permit the transfer chambers in the mould center section to be filled with rubber from said injection port.

11. A moulding apparatus according to claim 8 in which the casing includes a carriage to support the mould center section when the casing is in the operative position, the casing having runners along which the carriage may be moved to carry the mould center-section between its two positions.

12. A moulding apparatus according to claim 7 in which the mould cavities are movable towards each other within the casing by two separate means, one a high pressure short stroking ram to force the cavities against the mould center-section to transfer rubber out of the transfer chambers and the other, at least one long stroking auxiliary ram to bring the mould cavities together to join the article parts after removal of the mould center section to a position clear of the mould cavities.

13. A moulding apparatus for moulding a hollow rubber article which is first formed in two separate parts, the apparatus comprising:
upper and lower mould halves arranged in vertical alignment for relative movement towards and away from each other, each mould half having a mould cavity and a locking spue groove to prevent accidental displacement of a rubber part when moulded in that mould cavity;
two sleeves each surrounding and carried by a respective mould half;
a heat sink arranged in side-by-side relation with said upper and lower mould halves and comprising upper and lower heat sink members each having one or more cavities arranged in vertical alignment, said heat sink members being arranged for relative movement towards and away from each other;
two sleeves each surrounding and carried by a respective heat sink member;
a mould center section having two sets of male formers, one set corresponding to the cavities in both the upper mould half and to the cavities in the upper heat sink members, and the other set corresponding to the cavities in both the lower mould half and to the cavities in the lower heat sink members; and
means to carry the center section from a first position in which the first and second sets of male formers are in alignment respectively with the cavities in the upper and lower mould halves, and a second position in which the male formers are in alignment respectively with the cavities in the upper and lower heat sink members, said center section having a chamber to receive molten uncured rubber, and conduits by which the rubber can be fed under pressure to said mould cavities, and a retractable casing mounted for movement between an operative position in which it encompasses the mould and an inoperative position in which the interior of the mould is accessible to the operator of the mould, said casing having in its upper and lower walls thereof apertures each provided with a seal which engages with a respective one of said sleeves carried by the mould halves and the heat sink members at least when the casing is in its operative position.

* * * * *